(12) United States Patent
Higashiyama et al.

(10) Patent No.: US 11,294,176 B2
(45) Date of Patent: Apr. 5, 2022

(54) DISPLAY DEVICE, DISPLAY CONTROL METHOD, AND STORAGE MEDIUM

(71) Applicant: HONDA MOTOR CO., LTD., Tokyo (JP)

(72) Inventors: Masafumi Higashiyama, Wako (JP); Takuya Kimura, Wako (JP); Shinji Kawakami, Wako (JP); Tatsuya Iwasa, Wako (JP); Yuji Kuwashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 413 days.

(21) Appl. No.: 16/529,850

(22) Filed: Aug. 2, 2019

(65) Prior Publication Data
US 2020/0049985 A1 Feb. 13, 2020

(30) Foreign Application Priority Data
Aug. 7, 2018 (JP) .............................. JP2018-148549

(51) Int. Cl.
*G02B 27/01* (2006.01)
*B60K 35/00* (2006.01)
*G02B 5/08* (2006.01)

(52) U.S. Cl.
CPC .......... *G02B 27/0101* (2013.01); *B60K 35/00* (2013.01); *G02B 5/0808* (2013.01)

(58) Field of Classification Search
CPC ............ G02B 27/0101; G02B 27/0172; G02B 2027/0118; G02B 2027/0178;
(Continued)

(56) References Cited

U.S. PATENT DOCUMENTS

2013/0116859 A1* 5/2013 Ihlenburg .............. B60W 10/18
701/2
2016/0225260 A1* 8/2016 Lin ................... G08G 1/096791
(Continued)

FOREIGN PATENT DOCUMENTS

JP 2016-088124 5/2016
JP 2017-091115 5/2017
(Continued)

OTHER PUBLICATIONS

Japanese Notice of Allowance for Japanese Patent Application No. 2018-148549 dated Jan. 4, 2022.

*Primary Examiner* — William R Alexander
*Assistant Examiner* — Sharrief I Broome
(74) *Attorney, Agent, or Firm* — Amin, Turocy & Watson, LLP

(57) ABSTRACT

A display device includes a light projector configured to project light including an image, an optical mechanism provided on a path of the light and capable of adjusting a distance from a predetermined position to a position where the light is formed as a virtual image, a concave mirror configured to reflect light passing through the optical mechanism toward a reflector, a first actuator configured to adjust the distance in the optical mechanism, and a controller configured to control the light projector and the first actuator. The controller causes the first actuator to change the distance and causes the light projector to project light including an opening image, at a time of an operation start of the display device.

10 Claims, 6 Drawing Sheets

(58) Field of Classification Search
CPC ...... G02B 2027/0123; G02B 2027/013; G02B 2027/011; G02B 27/0149; G02B 27/017; G02B 2027/015; G02B 2027/0138; G02B 2027/014; G02B 27/01; G02B 27/0176; G02B 5/30; G02B 27/283; G02B 2027/0159; G02B 2027/0194; G02B 2027/012; G02B 2027/0132; B60K 35/00; B60K 2370/1529; B60K 2370/334; B60K 2370/23; B60K 2370/66; B60K 2370/691; B60K 2370/785; B60K 37/04; B60K 2370/152; B60K 2370/1534; B60K 2370/155; B60K 2370/177; B60K 2370/197; B60K 2370/21; B60K 2370/25; B60K 2370/31; B60K 2370/35; B60K 2370/52; B60K 2370/682; B60K 2370/693; G09G 3/2003; G09G 2310/0235; G09G 2340/0471; G09G 2340/0478; G09G 3/32; G09G 3/3208; G09G 3/3225; G09G 3/3233; G09G 3/34; G09G 5/00; G09G 2320/0626; G09G 2354/00; G09G 2360/14; G09G 2360/144; G09G 2380/10; G09G 3/02; G09G 3/2096; G09G 3/3406; G09G 3/3413

See application file for complete search history.

(56) References Cited

U.S. PATENT DOCUMENTS

| | | | |
|---|---|---|---|
| 2018/0061129 A1* | 3/2018 | Sisbot | G06T 19/006 |
| 2018/0149867 A1* | 5/2018 | Kremers | B32B 17/10568 |
| 2018/0180878 A1* | 6/2018 | Yokoe | B60K 35/00 |
| 2019/0206149 A1* | 7/2019 | Sakurada | G07C 5/0825 |
| 2019/0241099 A1* | 8/2019 | Sugiyama | B60N 2/64 |

FOREIGN PATENT DOCUMENTS

| | | |
|---|---|---|
| JP | 2017-122894 | 7/2017 |
| JP | 2018-012359 | 1/2018 |
| JP | 2018-103902 | 7/2018 |

* cited by examiner

DISPLAY DEVICE, DISPLAY CONTROL METHOD, AND STORAGE MEDIUM

CROSS-REFERENCE TO RELATED APPLICATION

Priority is claimed on Japanese Patent Application No. 2018-148549, filed Aug. 7, 2018, the content of which is incorporated herein by reference.

BACKGROUND

Field of the Invention

The present invention relates to a display device, a display control method, and a storage medium.

Description of Related Art

In the related art, a head up display (HUD) device that displays an image related to basic information for a driver on a front windshield is known (refer to, for example, Japanese Unexamined Patent Application First Publication No. 2017-91115). Using this HUD device, the driver is able to ascertain various pieces of displayed information while maintaining a direction of a line of sight to the front at the time of driving by displaying various marks indicating an obstacle, a caution, and a progress direction superimposed on a landscape in front of a vehicle.

SUMMARY

However, in the prior art, a suitable operation is not able to be performed at the time of an operation start in some cases.

An aspect of the present invention has been made in consideration of such circumstances and an object of the aspect of the present invention is to provide a display device, a display control method, and a storage medium capable of performing a suitable operation at the time of an operation start.

A display device according to the present invention adopts the following constitutions.

(1): A display device according to an aspect of the present invention includes a light projector configured to project light including an image, an optical mechanism provided on a path of the light and capable of adjusting a distance from a predetermined position to a position where the light is formed as a virtual image, a concave mirror configured to reflect light passing through the optical mechanism toward a reflector, a first actuator configured to adjust the distance in the optical mechanism, and a controller configured to control the light projector and the first actuator. The controller causes the first actuator to change the distance and causes the light projector to project light including an opening image, at a time of an operation start of the display device.

(2): In the aspect of (1) described above, the controller causes the first actuator to change the distance from a shortest distance to a longest distance and then change the distance from the longest distance to the shortest distance at the time of the operation start of the display device.

(3): In the aspect of (2) described above, the controller causes the light projector to project the light including the opening image while the distance is changed from the longest distance to the shortest distance at the time of the operation start of the display device.

(4): In the aspect of (2) described above, the controller does not cause the light projector to project the light while the distance is changed from the shortest distance to the longest distance at the time of the operation start of the display device.

(5): In the aspect of (2) described above, the display device is mounted on a vehicle, in a case in which an unlocking of the door of the vehicle or an opening of the door is detected, the controller changes the distance from the shortest distance to the longest distance, and in a case in which a closing of the door of the vehicle or a start of a drive device is detected, the controller changes the distance from the longest distance to the shortest distance.

(6): In the aspect of (1) described above, the display device further includes a second actuator configured to adjust a reflection angle of the concave mirror, and a reception unit configured to receive an instruction to adjust the reflection angle, and the opening image is an image for prompting the adjustment of the reflection angle of the concave mirror.

(7): In the aspect of (1) described above, the controller causes the light projector to project light including an ending image that is gradually reduced in a state in which the distance is not changed at a time of an operation end of the operation of the display device.

(8): In the aspect of (7) described above, the display device is mounted on a vehicle, and the controller controls the first actuator so that the distance is reduced as a speed of the vehicle is reduced.

(9): A display control method according to an aspect of the present invention causes a controller of a display device, which includes a light projector configured to project light including an image, an optical mechanism provided on a path of the light and capable of adjusting a distance from a predetermined position to a position where the light is formed as a virtual image, a concave mirror configured to reflect light passing through the optical mechanism toward a reflector, a first actuator configured to adjust the distance in the optical mechanism, and the controller configured to control the light projector and the first actuator, to instruct the first actuator to change the distance at a time of an operation start of the display device, and instruct the light projector to project light including an opening image at the time of the operation start of the display device.

(10): A storage medium according to an aspect of the present invention stores a program that causes a controller of a display device, which includes a light projector configured to project light including an image, an optical mechanism provided on a path of the light and capable of adjusting a distance from a predetermined position to a position where the light is formed as a virtual image, a concave mirror configured to reflect light passing through the optical mechanism toward a reflector, a first actuator configured to adjust the distance in the optical mechanism, and the controller configured to control the light projector and the first actuator, to instruct the first actuator to change the distance at a time of an operation start of the display device, and instruct the light projector to project light including an opening image at the time of the operation start of the display device.

According to the aspects of (1) to (10), it is possible to perform (or cause a display device to perform) a suitable operation at a time of an operation start.

According to the aspects (2) to (4) described above, it is possible to increase an entertainment property while performing an operation check of a function capable of changing the distance from the predetermined position to the position where the light is formed as the virtual image.

According to the aspects (7) and (8) described above, it is possible to avoid performance of unnecessary drive control.

DESCRIPTION OF EMBODIMENTS

Hereinafter, an embodiment of a display device, a display control method, and a storage medium of the present invention will be described with reference to the drawings. The display device is of an embodiment, for example, a device that is mounted on a vehicle (hereinafter referred to as a vehicle M) and causes an image to be viewed by being superimposed on a landscape. The display device is able to be referred to as a HUD device. As an example, a display device is a device that allows a viewer to visually recognize a virtual image by projecting light including an image on a front windshield of the vehicle M. The viewer is, for example, a driver, however, the viewer may be a passenger other than the driver. The display device may be a display device projecting light on a transparent member (a visor, a lens of glasses, or the like) of a device worn by a person. In the following description, it is assumed that the display device is mounted on the vehicle M and projects light including an image on the front windshield.

In the following description, a positional relationship and the like will be described using an XYZ coordinate system as appropriate.

[Overall Constitution]

Figure 1:
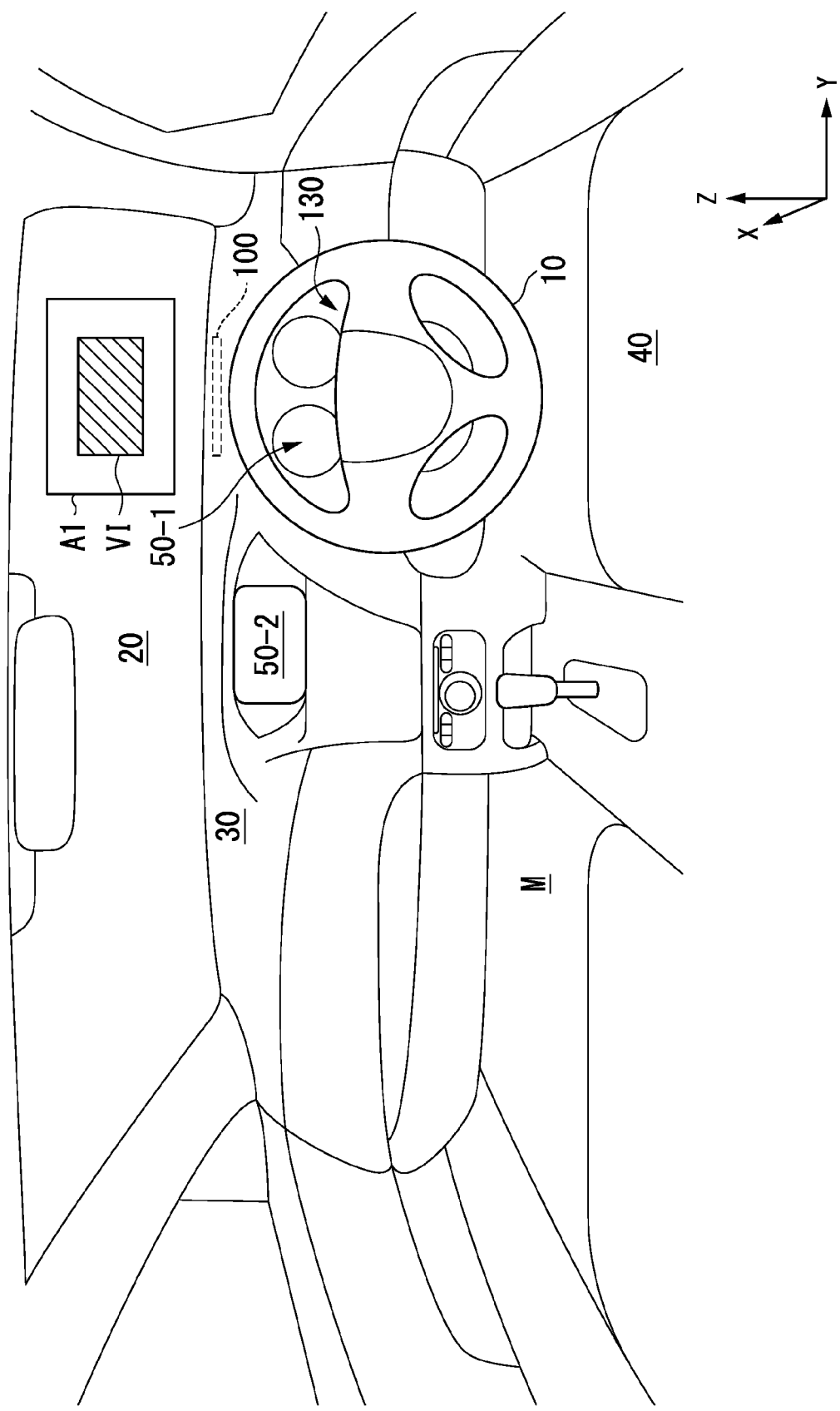
FIG. 1 is a diagram exemplifying a constitution of an interior of a vehicle on which a display device according to an embodiment is mounted.

FIG. 1 is a diagram exemplifying a constitution of an interior of the vehicle M on which a display device 100 according to an embodiment is mounted. The vehicle M is provided with, for example, a steering wheel 10 that controls steering of the vehicle M, a front windshield (an example of a reflector) 20 that divides the interior of the vehicle from the outside of the vehicle, and an instrument panel 30. The front windshield 20 is a member having light transparency. The display device 100 allows the driver sitting on a driver's seat to visually recognize a virtual image VI by, for example, projecting light including an image on a displayable area A1 provided in a part of the front windshield 20 in front of a driver's seat 40.

The display device 100 causes the driver to visually recognize an image obtained by imaging, for example, information for supporting driving of the driver as a virtual image VI. The information for supporting the driving of the driver includes, for example, information of a speed of the vehicle M, a driving power distribution ratio, engine revolutions, an operation state of a driving support function, a shift position, a sign recognition result, an intersection point position, and the like. The driving support function includes, for example, a direction indication function for guiding the vehicle M to a destination that is set in advance, an adaptive cruise control (ACC), a lane keep assist system (LKAS), a collision mitigation brake system (CMBS), a traffic jam assist function, and the like. The driving support function may include, for example, an incoming call or outgoing call of a telephone mounted on the vehicle M, and a telephone function for managing a call.

In addition to the display device 100, the vehicle M may be provided with a first display unit 50-1 and a second display unit 50-2. The first display unit 50-1 is a display device provided, for example, in the vicinity of the front of the driver's seat 40 in the instrument panel 30 and is able to be visually recognized by the driver from a gap of the steering wheel 10 or is able to be visually recognized through the steering wheel 10. The second display unit 50-2 is attached to, for example, a central portion of the instrument panel 30. The second display unit 50-2 displays, for example, an image corresponding to a navigation process performed by a navigation device (not shown) mounted on the vehicle M, or a video of the other party in a videophone or the like. The second display unit 50-2 may display a television program, reproduce a DVD, or display contents such as a downloaded movie.

The vehicle M is provided with an operation switch (an example of an operator) 130 that receives an instruction to switch on/off the display by the display device 100 or an instruction to adjust a position of the virtual image VI. The operation switch 130 is attached, for example, to a position where the driver sitting on the driver's seat 40 is able to operate without greatly changing a posture. The operation switch 130 may be provided, for example, in front of the first display unit 50-1, may be provided on a boss portion of the steering wheel 10, or may be provided on a spoke that connects the steering wheel 10 and the instrument panel 30 with each other.

Figure 2:
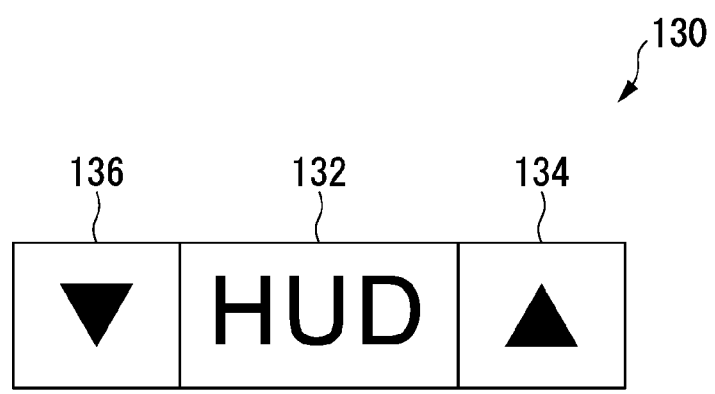
FIG. 2 is a diagram for describing an operation switch of the embodiment.

FIG. 2 is a diagram for describing the operation switch 130 of the embodiment. The operation switch 130 includes, for example, a main switch 132, and adjustment switches 134 and 136. The main switch 132 is a switch that switches on/off of the display device 100.

The adjustment switch 134 is, for example, a switch for receiving an instruction to move the position of the virtual image VI that is visually recognized as being in a space transmitted from a line of sight position P1 of the driver through the displayable area A1 to an upper side (hereinafter, referred to as an upward direction) with respect to a vertical direction Z. The driver is able to continuously move the visually recognized position of the virtual image VI in the upward direction in the displayable area A1 by continuously pressing the adjustment switch 134.

The adjustment switch 136 is a switch for receiving an instruction to move the position of the virtual image VI described above to a lower side (hereinafter, referred to as a downward direction) with respect to the vertical direction Z. The driver is able to continuously move the visually recognized position of the virtual image VI in the downward direction in the displayable area A1 by continuously pressing the adjustment switch 136.

The adjustment switch 134 may be a switch for increasing a brightness of the virtual image VI to be visually recognized instead of (or in addition to) moving the position of the virtual image VI in the upward direction. The adjustment switch 136 may be a switch for reducing the brightness of the virtual image VI to be visually recognized instead of (or in addition to) moving the position of the virtual image VI in the downward direction. Contents of the instruction received by the adjustment switches 134 and 136 may be switched on the basis of a certain operation. The certain operation is, for example, a long press operation of the main switch 132. In addition to the switches shown in FIG. 2, the operation switch 130 may include, for example, a switch for selecting display content or a switch for adjusting the brightness of the virtual image to be exclusively displayed.

Figure 3:
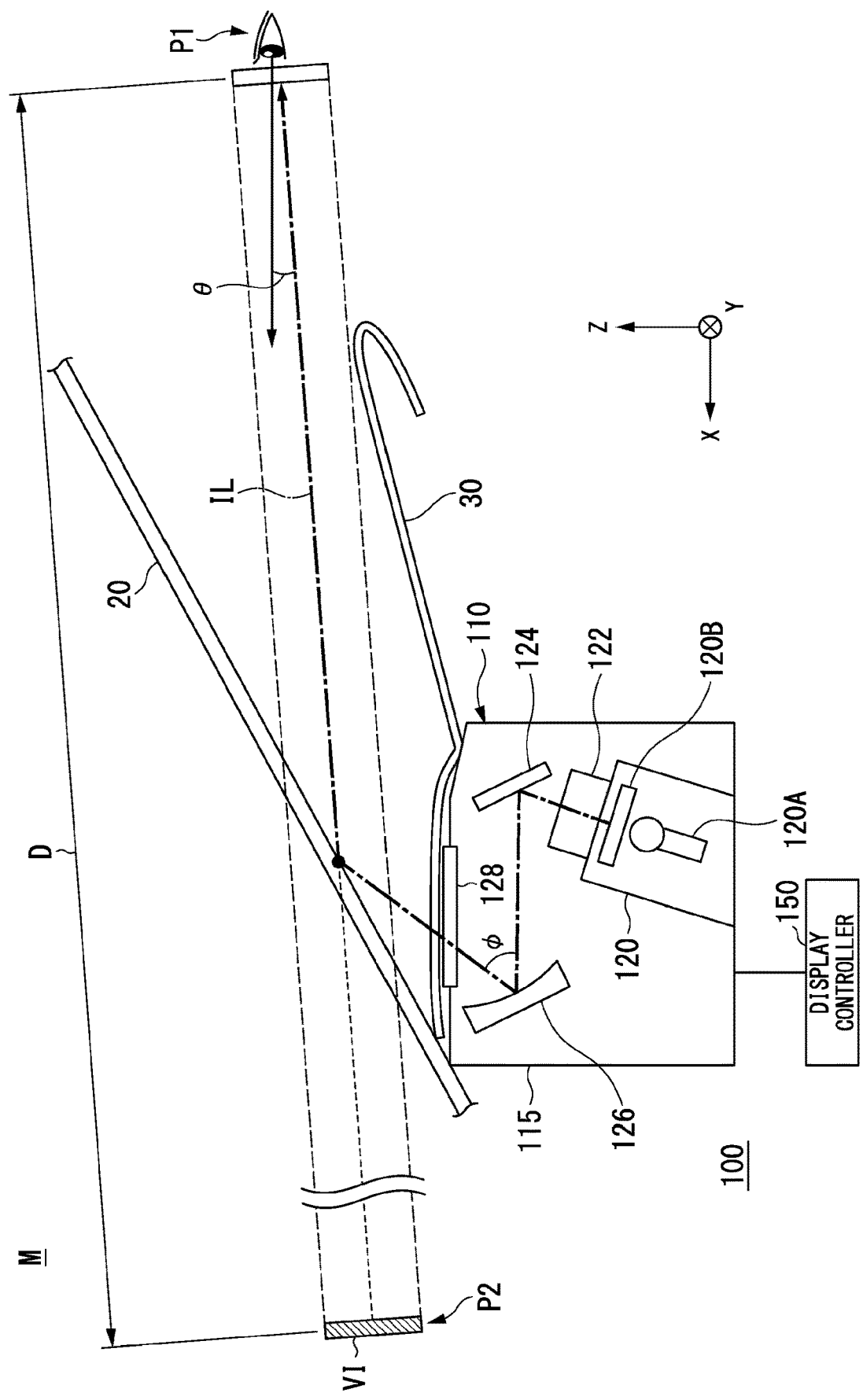
FIG. 3 is a partial constitution diagram of the display device.

FIG. 3 is a partial constitution diagram of the display device 100. The display device 100 includes, for example, a display (an example of an image generation device) 110 and a display controller (an example of a controller) 150. The display 110 accommodates a light projector 120, an optical mechanism 122, a plane mirror 124, a concave mirror 126, and a light transmission cover 128, for example, in a housing 115. In addition to these, the display device 100 includes various sensors and actuators, which will be described later.

The light projector 120 includes, for example, a light source 120A and a display element 120B. The light source 120A is, for example, a cold cathode tube, and outputs visible light corresponding to the virtual image VI to be visually recognized by the driver. The display element 120B controls transmission of the visible light from the light source 120A. The display element 120B is, for example, a liquid crystal display (LCD) of a thin film transistor (TFT) type. The display element 120B includes an image element in the virtual image VI by controlling each of a plurality of pixels to control a transmission degree of the visible light from the light source 120A for each color element, and determines a form (look) of the virtual image VI. Hereinafter, the visible light transmitted through the display element 120B and including the image is referred to as image light IL. The display element 120B may be an organic EL (electro-luminescence) display, and in this case the light source 120A may be omitted.

The optical mechanism 122 includes, for example, one or more lenses. The position of each lens is able to be adjusted, for example, in an optical axis direction. The optical mechanism 122 is provided, for example, on a path of the image light IL output from the light projector 120, and passes the image light IL incident from the light projector 120 and emits the image light IL toward the front windshield 20. The optical mechanism 122 is able to adjust, for example, a distance (hereinafter referred to as a virtual image visual recognition distance D) from the line of sight position P1 of the driver to a formation position P2 where the image light IL is formed as the virtual image by changing the position of the lens. The line of sight position P1 of the driver is a position where the image light IL is collected by being reflected by the concave mirror 126 and the front windshield 20, and is a position where it is assumed that the eyes of the driver are present at this position. The virtual image visual recognition distance D is strictly a distance of a line segment having an inclination in the vertical direction, however, in the following description, in a case in which it is expressed that "the virtual image visual recognition distance D is 7 [m]" or the like, the distance may mean the distance in the horizontal direction.

In the following description, a depression angle θ is defined as an angle formed by a horizontal plane passing through the line of sight position P1 of the driver and the line segment from the line of sight position P1 of the driver to the formation position P2. The more the virtual image VI is formed downward, that is, the more downward the line of sight direction at which the driver views the virtual image VI, the larger the depression angle θ. The depression angle θ is determined on the basis of a reflection angle φ of the concave mirror 126 and a display position of an original image on the display element 120B. The reflection angle φ is an angle formed by an incident direction in which the image light IL reflected by the plane mirror 124 enters the concave mirror 126 and an emission direction in which the concave mirror 126 emits the image light IL.

The plane mirror 124 reflects the visible light (that is, the image light IL) emitted by the light source 120A and having passed through the display element 120B in a direction of the concave mirror 126.

The concave mirror 126 reflects the image light IL incident from the plane mirror 124 and emits the image light IL toward the front windshield 20. The concave mirror 126 is supported so as to be rotatable (pivotable) about a Y axis that is an axis in a width direction of the vehicle M.

The light transmission cover 128 transmits the image light IL from the concave mirror 126 to cause the image light IL to reach the front windshield 20, and suppresses an entry of a foreign matter such as dust, dirt, or a water droplet into the housing 115. The light transmission cover 128 is provided in opening formed in an upper member of the housing 115. The instrument panel 30 is also provided with an opening or a light transmission member, and the image light IL passes through the light transmission cover 128 and the opening of the instrument panel 30 or the light transmission member of the instrument panel IP to be reached the front windshield 20.

The image light IL incident on the front windshield 20 is reflected by the front windshield 20 and condensed at the line of sight position P1 of the driver. At this time, in a case in which the eye of the driver is positioned at the line of sight position P1, the driver feels that the image captured by the image light IL is displayed in front of the vehicle M.

Figure 4:
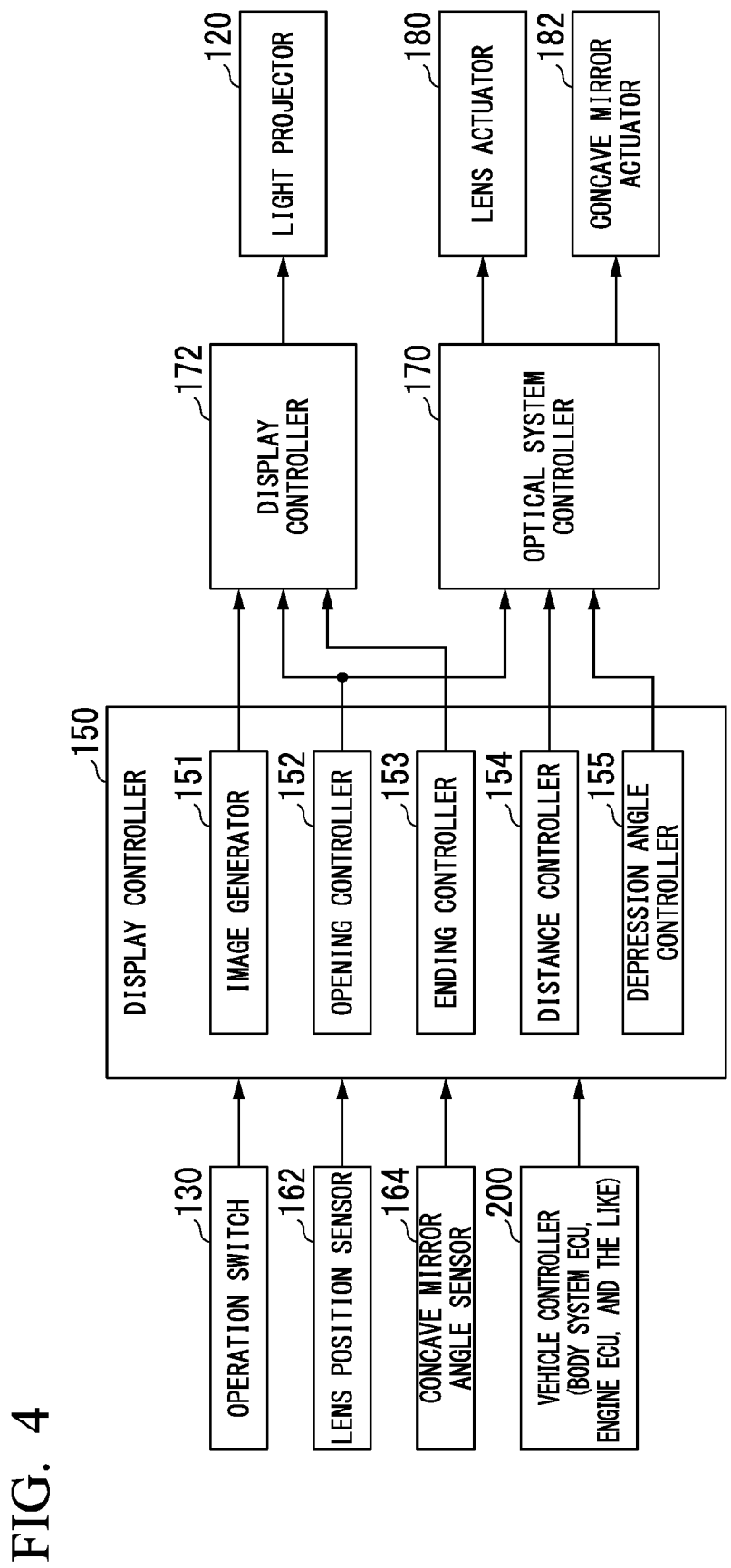
FIG. 4 is a diagram showing a display device constitution example centering on a display controller.

The display controller 150 controls the display of the virtual image VI which is to be visually recognized by the driver. FIG. 4 is a diagram showing a constitution example of the display device 100 centering on the display controller 150. In an example of FIG. 4, in addition to the display controller 150, a light projector 120, an operation switch 130, a lens position sensor 162, a concave mirror angle sensor 164, an optical system controller 170, a display controller 172, a lens actuator (an example of a first actuator) 180, a concave mirror actuator (an example of a second actuator) 182, and a vehicle controller 200 are shown. First, each constitution other than the display controller 150 will be described.

The lens position sensor 162 detects a position of one or more lenses included in the optical mechanism 122. The concave mirror angle sensor 164 detects a rotation angle of the concave mirror 126 about the Y axis.

The optical system controller 170 drives the lens actuator 180 on the basis of the control signal output by the display controller 150 to adjust the virtual image visual recognition distance D. The virtual image visual recognition distance D is able to be adjusted, for example, within a range of several [m] to a several tens [m] (or several tens [m]). Hereinafter, a lower limit of the adjustable range is referred to as a shortest distance Dmin, and an upper limit thereof is referred to as a longest distance Dmax. The optical system controller 170 drives the concave mirror actuator 182 on the basis of the control signal output by the display controller 150 to adjust the reflection angle φ of the concave mirror.

The display controller 172 causes the light projector 120 to project the light including the image based on the signals provided from an image generator 151, an opening controller 152, and an ending controller 153.

The lens actuator 180 acquires a drive signal from the optical system controller 170, drives a motor or the like on the basis of the acquired drive signal, and moves the position of one or more lenses included in the optical mechanism 122. Therefore, the virtual image visual recognition distance D is adjusted.

The concave mirror actuator 182 acquires a drive signal from the optical system controller 170, drives a motor or the like on the basis of the acquired drive signal, and rotates the concave mirror actuator 182 about the Y axis to adjust the reflection angle φ of the concave mirror 126. Therefore, the depression angle θ is adjusted.

The vehicle controller 200 is an electronic controller (ECU) of a body system that detects and controls a lock/unlock state or an open/close state of a vehicle door, an engine ECU that controls a traveling drive device such as an engine or a motor, and the like. As an example, the vehicle controller 200 outputs a signal and the like indicating a speed of the vehicle M, the number of engine revolutions, an operation state of a direction indicator, the lock/unlock or the open/close state of the vehicle door, and an engine start instruction (ignition on) to the display controller 150.

The display controller 150 includes, for example, the image generator 151, the opening controller 152, the ending controller 153, a distance controller 154, and a depression angle controller 155. Such constitution elements are realized, for example, by a hardware processor such as a central processor (CPU) executing a program (software). Some or all of such constitution elements may be realized by hardware (a circuit unit; including a circuitry) such as a large scale integration (LSI), an application specific integrated circuit (ASIC), a field-programmable gate array (FPGA), and a graphics processing unit (GPU) or may be realized by a cooperation of software and hardware. The program may be stored in advance in a storage device such as a HDD or a flash memory, stored in a removable storage medium such as a DVD or a CD-ROM, or may be installed by attachment of a storage medium to a drive device. The division of the configuration elements of the display controller 150 is merely for convenience, and does not mean that software and hardware are clearly separated as shown in the figure.

The image generator 151 generates an image excluding an opening image and an ending image. The "generate" is a convenient expression, and may simply refer to an operation of reading image data from a storage device and outputting the image data to the display controller 172. The image generator 151 generates, for example, an image for causing the driver to recognize the speed of the vehicle M, the driving force distribution ratio, the engine revolutions, the operation state of the driving support function, the shift position, and the like. The image generator 151 may generate an image according to an event (for example, an output of a lane change guide by a navigation device) that occurs in the vehicle M.

The opening controller 152 and the ending controller 153 will be described later.

The distance controller 154 outputs the control signal for adjusting the virtual image visual recognition distance D to the optical system controller 170. For example, the distance controller 154 increases the virtual image visual recognition distance D as the speed of the vehicle M is increased, and reduces the virtual image visual recognition distance D as the speed of the vehicle M is reduced. This matches a tendency of the driver to view a distance as the speed is increased. Since the speed is zero in a case in which the vehicle M is stopped, the distance controller 154 adjusts the virtual image visual recognition distance D to the shortest distance Dmin.

The depression angle controller 155 outputs the control signal for adjusting the reflection angle φ of the concave mirror 126 to the optical system controller 170. For example, the depression angle controller 155 adjusts the reflection angle φ on the basis of the operation on the operation switch 130. The depression angle controller 155 reduces the reflection angle φ and reduces the depression angle θ as the virtual image visual recognition distance D is increased.

[Regarding Opening and Ending]

Hereinafter, functions of the opening controller 152 and the ending controller 153 will be described. At the time of an operation start of the display device 100, the opening controller 152 causes the lens actuator 180 to change the virtual image visual recognition distance D (through the optical system controller 170) and causes the light projector 120 to project light including the opening image (through the display controller 172). Hereinafter, the related control is referred to as opening control. The time of the operation start of the display device 100 refers to, for example, a period from when the door of the vehicle M is unlocked to when the engine or the like is started and the vehicle M is in a state in which the vehicle M is able to travel.

More specifically, in the opening control, the opening controller 152 causes the lens actuator 180 to change the virtual image visual recognition distance D from the shortest distance Dmin to the longest distance Dmax and then change the virtual image visual recognition distance D from the longest distance Dmax to the shortest distance Dmin at time T3. The related operation also has an operation of checking of whether a function of varying the virtual image visual recognition distance D is normally operated.

At this time, while the virtual image visual recognition distance D is changed from the shortest distance Dmin to the longest distance Dmax, the opening controller 152 does not cause the light projector 120 to project the light including the image, and while the virtual image visual recognition distance D is changed from the longest distance Dmax to the shortest distance Dmin, the opening controller 152 causes the light projector 120 to project the light including the opening image. The opening image may be, for example, an image including a logo of a car maker, and any image is prepared as the opening image. Therefore, it is possible to allow the occupant (especially the driver) of the vehicle M visually recognize that the opening image is gradually approaching. As a result, it is possible to increase an entertainment property at the time of start of the vehicle M while performing an operation check of a function capable of changing the virtual image visual recognition distance D. The fact that the virtual image visual recognition distance D is the shortest distance Dmin at a time point when the opening control is completed also matches a control target for the virtual image visual recognition distance D of the distance controller 154 before start, that is, in a state in which the speed is zero. Therefore, it is possible to avoid performance of unnecessary drive control.

Figure 5:
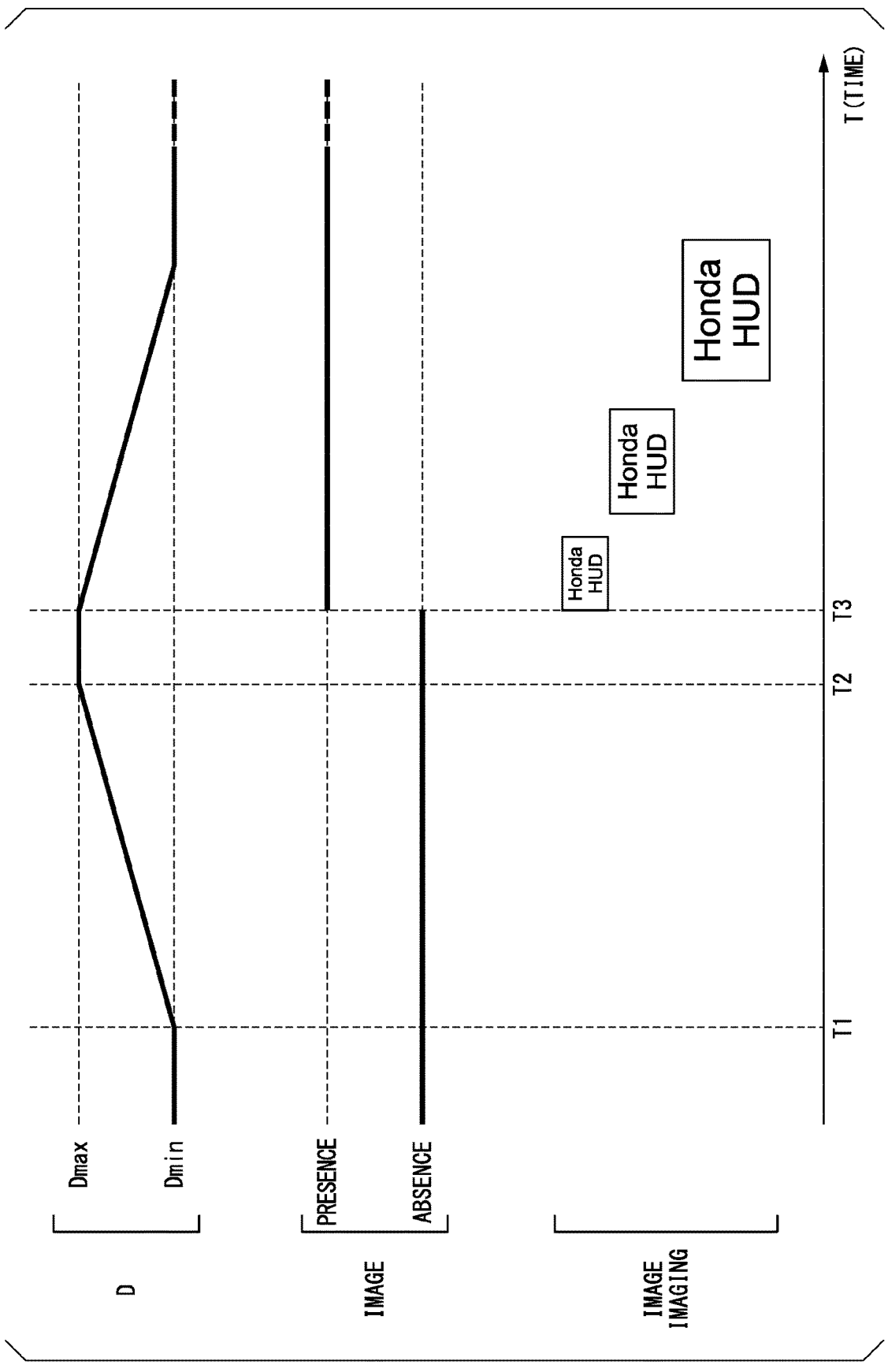
FIG. 5 is a timing chart showing operations and the like of each unit in opening control.

FIG. 5 is a timing chart showing operations and the like of each unit in the opening control. At time T1, the opening controller 152 starts to change the virtual image visual recognition distance D from the shortest distance Dmin to the longest distance Dmax, and after the virtual image visual recognition distance D reaches the longest distance Dmax at time T2, the opening controller 152 starts to change the virtual image visual recognition distance D from the longest distance Dmax to the shortest distance Dmin. Between the time T1 and the time T3, the display of the opening image is not performed, and the display of the opening image is performed after the time T3.

Until the time T3, since only perception to an extent that a motor sound of the lens actuator 180 is generated for the occupant of vehicle M, it is preferable that the operation up to that point is executed with a sense of schedule that "is finished for a while". Therefore, it is preferable that the time T1 is, for example, a timing when the door of the vehicle M is unlocked or a timing when the door of the vehicle M is opened. It is preferable that the time T3 is a timing when the driver visually recognizes the virtual image VI by the display device 100. For example, it is preferable that the time T3 is a timing when the door of the vehicle M is opened and then closed, or the traveling drive device such as an engine is started.

Figure 6:
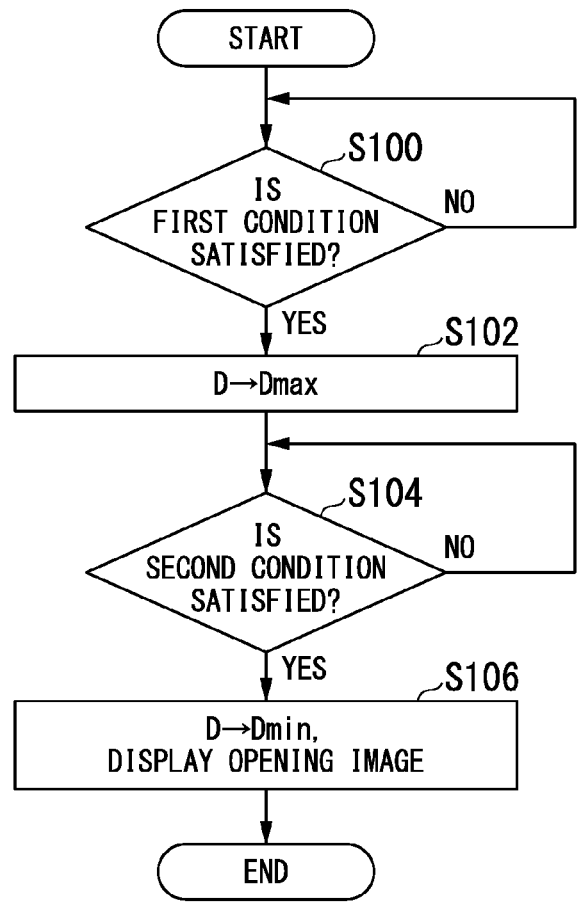
FIG. 6 is a flowchart showing an example of a flow of a process by an opening controller.

FIG. 6 is a flowchart showing an example of a flow of a process by the opening controller 152. The process of the present flowchart is started, for example, when the vehicle M is in a parking state. The parking state refers to a state in which the traveling drive device is stopped and power supply to a device from a battery is stopped except for a device (including the display controller 150) maintained as a standby state.

First, the opening controller 152 determines whether or not a first condition is satisfied (step S100). As described above, the first condition is a condition that the door of the vehicle M is unlocked, a condition the door of the vehicle M is opened, or a condition similar thereto. In a case in which the first condition is satisfied, the opening controller 152 changes the virtual image visual recognition distance D from the shortest distance Dmin to the longest distance Dmax (step S102).

In a case in which the virtual image visual recognition distance D reaches the longest distance Dmax, the opening controller 152 determines whether or not the second condition is satisfied (step S104). As described above, the second condition is a condition that the door of the vehicle M is closed after the door is opened, a condition that a traveling drive device such as an engine is started, or a condition similar thereto. In a case in which the second condition is satisfied, the opening controller 152 causes the light projector 120 to project the light including the opening image while changing the virtual image visual recognition distance D from the longest distance Dmax to the shortest distance Dmin (step S106). Thereafter, the opening controller 152 stops the control at a desired timing, and the control is transferred to the image generator 151 and the distance controller 154.

Figure 7:
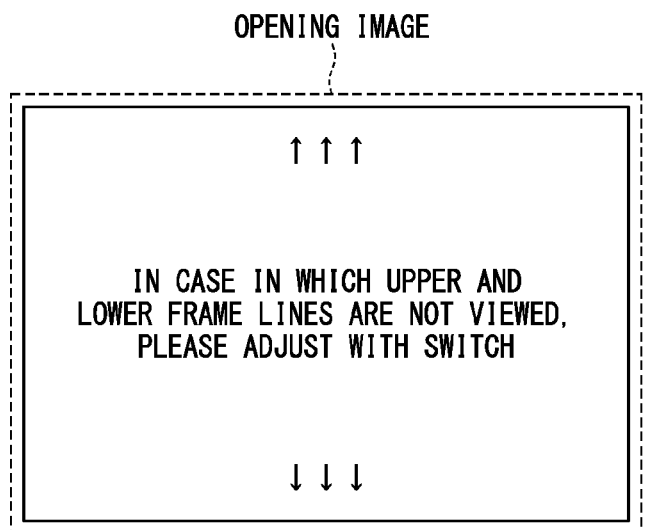
FIG. 7 is a diagram showing an example of an opening image for prompting a depression angle adjustment.

Here, the depression angle controller 155 may receive the adjustment operation of the reflection angle φ of the concave mirror 126, for example, after the time T3. In this case, it is preferable that the opening image is an image that is able to confirm an outer frame of a maximum visual recognition area of the virtual image VI. This is because a phenomenon in which a part of the virtual image VI is not able to be visually recognized may also occur in accordance with a combination of the driver's a physique or the like and the reflection angle φ of the concave mirror 126. FIG. 7 is a diagram showing an example of the opening image for prompting the depression angle adjustment. For example, the opening image of the shown example is preferably an image on which some light is projected through at least a display element of an outer frame portion of display elements 120B arranged in a rectangular shape and which prompts the adjustment of the depression angle to a position where an upper portion and a lower portion of the outer frame portion are viewed.

The ending controller 153 causes the light projector 120 to project light including the ending image at a time of an operation end of the display device 100. The time of the operation end of the display device 100 is, for example, when the vehicle M is stopped and system power of the vehicle M is turned off. The ending controller 153 causes the light projector 120 to project the light including the ending image that is gradually reduced in a state in which the virtual image visual recognition distance D is not changed. At this time, since the vehicle M has already stopped, the virtual image visual recognition distance D is the shortest distance Dmin. Even in a case in which the ending image is displayed while increasing the virtual image visual recognition distance D, a similar effect is able to be obtained. However, since it is preferable to maintain the virtual image visual recognition distance D at the shortest distance Dmin during parking, the occupant is caused to image an end of an operation just by changing a size of the image. Therefore, it is possible to avoid performance of unnecessary drive control.

According to the display device 100 of the embodiment described above, the display device 100 includes the light projector 120 configured to project the light including the image, the optical mechanism 122 provided on the path of the light and capable of adjusting the virtual image visual recognition distance D from a predetermined position to a position where the light is formed as the virtual image, the concave mirror 126 configured to reflect light passing through the optical mechanism 122 toward a reflector, the lens actuator 180 configured to adjust the virtual image visual recognition distance D in the optical mechanism 122, and the display controller 150 configured to control the light projector 120, the optical mechanism 122, the concave mirror 126, and the lens actuator 180. The display controller 150 causes the lens actuator 180 to change the virtual image visual recognition distance D and causes the light projector 120 to project the light including the opening image, at the time of the operation start of the display device 100. Therefore, it is possible to perform a suitable operation at the time of the operation start.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A display device comprising:
a light projector configured to project light including an image;
an optical mechanism provided on a path of the light and capable of adjusting a distance from a predetermined position to a position where the light is formed as a virtual image;
a concave mirror configured to reflect light passing through the optical mechanism toward a reflector;
a first actuator configured to adjust the distance in the optical mechanism; and
a controller configured to control the light projector and the first actuator, wherein the controller causes the first actuator to change the distance and causes the light projector to project light including an opening image, at a time of an operation start of the display device.

2. The display device according to claim 1,
wherein the controller causes the first actuator to change the distance from a shortest distance to a longest distance and then change the distance from the longest distance to the shortest distance at the time of the operation start of the display device.

3. The display device according to claim 2,
wherein the controller causes the light projector to project the light including the opening image while the distance is changed from the longest distance to the shortest distance at the time of the operation start of the display device.

4. The display device according to claim 2,
wherein the controller does not cause the light projector to project the light while the distance is changed from the shortest distance to the longest distance at the time of the operation start of the display device.

5. The display device according to claim 2,
wherein the display device is mounted on a vehicle, and
wherein, in a case in which an unlocking of the door of the vehicle or an opening of the door is detected, the controller changes the distance from the shortest distance to the longest distance, and in a case in which a closing of the door of the vehicle or a start of a drive device is detected, the controller changes the distance from the longest distance to the shortest distance.

6. The display device according to claim 1, further comprising:
a second actuator configured to adjust a reflection angle of the concave mirror; and
a reception unit configured to receive an instruction to adjust the reflection angle by a user,
wherein the opening image is an image for prompting the adjustment of the reflection angle of the concave mirror.

7. The display device according to claim 1,
wherein the controller causes the light projector to project light including an ending image that is gradually reduced in a state in which the distance is not changed at a time of an operation end of the operation of the display device.

8. The display device according to claim 1,
wherein the display device is mounted on a vehicle, and
wherein the controller controls the first actuator so that the distance is reduced as a speed of the vehicle is reduced.

9. A display control method for a display device comprising a light projector configured to project light including an image, an optical mechanism provided on a path of the light and capable of adjusting a distance from a predetermined position to a position where the light is formed as a virtual image, a concave mirror configured to reflect light passing through the optical mechanism toward a reflector, a first actuator configured to adjust the distance in the optical mechanism, and the controller configured to control the light projector and the first actuator, the method causing a controller of the display device to:
cause the first actuator to change the distance at a time of an operation start of the display device: and
cause the light projector to project light including an opening image at the time of the operation start of the display device.

10. A non-transitory computer-readable storage medium that stores a program for a display device comprising a light projector configured to project light including an image, an optical mechanism provided on a path of the light and capable of adjusting a distance from a predetermined position to a position where the light is formed as a virtual image, a concave mirror configured to reflect light passing through the optical mechanism toward a reflector, a first actuator configured to adjust the distance in the optical mechanism, and the controller configured to control the light projector and the first actuator, the program causing a controller of the display device to:
cause the first actuator to change the distance at a time of an operation start of the display device: and
cause the light projector to project light including an opening image at the time of the operation start of the display device.

* * * * *